(12) United States Patent
Grobis et al.

(10) Patent No.: US 8,922,922 B2
(45) Date of Patent: Dec. 30, 2014

(54) METHOD TO REDUCE WRITTEN-IN ERRORS IN STORAGE MEDIA

(75) Inventors: Michael K. Grobis, San Jose, CA (US); Kurt A. Rubin, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 157 days.

(21) Appl. No.: 13/554,281

(22) Filed: Jul. 20, 2012

(65) Prior Publication Data

US 2014/0022660 A1    Jan. 23, 2014

(51) Int. Cl.
*G11B 27/36* (2006.01)

(52) U.S. Cl.
USPC .......................................................... 360/31

(58) Field of Classification Search
None
See application file for complete search history.

(56) References Cited

U.S. PATENT DOCUMENTS

| | | |
|---|---|---|
| 6,191,905 B1 | 2/2001 | Takeuchi |
| 6,785,071 B2 | 8/2004 | Elliott et al. |
| 7,848,041 B2 | 12/2010 | Takeo |
| 8,035,910 B2 | 10/2011 | Mallary et al. |
| 2001/0024335 A1 | 9/2001 | Blaum et al. |
| 2009/0287969 A1 | 11/2009 | White et al. |
| 2010/0118433 A1 | 5/2010 | Buch |
| 2010/0238779 A1 | 9/2010 | Chen et al. |
| 2011/0035634 A1 | 2/2011 | Blaum et al. |
| 2011/0249355 A1 | 10/2011 | Mallary et al. |

FOREIGN PATENT DOCUMENTS

WO    8902643    3/1989

*Primary Examiner* — Paul Huber

(57) ABSTRACT

A method of storing data in a storage medium includes determining a compensation unit for a portion of the storage medium, reading a first set of bit values from the portion of the storage medium, determining a compensation value based at least in part on an erroneous bit value of the first set of bit values and the compensation unit, and storing the compensation value in association with the portion of the storage medium.

22 Claims, 8 Drawing Sheets

| Case | Write Buffer (bit N in bold) | Read Buffer bit N value | Update to Precomp Buffer For Second Write Pass | Update to Precomp Buffer For Third Write Pass |
|---|---|---|---|---|
| 0 | x | x (no error) | No change in precomp | No change in precomp |
| 1 | x000x | 1 | No change in precomp | No change in precomp |
| 2 | x111x | 0 | No change in precomp | No change in precomp |
| 3 | x001x | 1 | $+\delta_1^+$ for write N+1 | $+\delta_2^+$ for write N+1 |
| 4 | x110x | 0 | $+\delta_1^+$ for write N+1 | $+\delta_2^+$ for write N+1 |
| 5 | x100x | 1 | $-\delta_1^-$ for write N | $-\delta_2^-$ for write N |
| 6 | x011x | 0 | $-\delta_1^-$ for write N | $-\delta_2^-$ for write N |
| 7 | x101x | 1 | $+\delta_1^+$ for write N+1 | $-\delta_1^+$ for write N+1, $-\delta_1^-$ for N |
| 8 | x010x | 0 | $+\delta_1^+$ for write N+1 | $-\delta_1^+$ for write N+1, $-\delta_1^-$ for N |

FIG. 3

METHOD TO REDUCE WRITTEN-IN ERRORS IN STORAGE MEDIA

FIELD OF THE DISCLOSURE

This disclosure, in general, relates methods to reduce written-in errors in storage media.

BACKGROUND

Magnetic media is used to store data. Continuous perpendicular media is one type of magnetic media that is prevalent. Other types of magnetic media are candidates for extending magnetic recording to 1 Tb/in$^2$ and above. These include Bit patterned media (BPM), thermal assisted recording media (TAR) or its alternative name of Heat assisted magnetic recording (HAMR) and discrete track media (DTM). Magnetic recording can employ synchronization between a write clock and specific disk locations during writing. For BPM, write errors can occur even for perfect synchronization due to statistical variations in the lithography placement and magnetic properties of an island, as well as the presence of gross defects. In the case of BPM media such defects can also be missing islands. One way to mitigate the effect of write errors is to increase the error correction code (ECC) strength, at the expense of loss of areal efficiency due to the associated overhead of disk real estate. For a given fabrication process, the statistical variations tend to scale unfavorably with increasing bit density. As ECC is to handle rare statistical variations in storage media properties, increasing ECC is not always an efficient way to compensate for write errors that occur in the write process. A more efficient storage scheme is achieved when write errors are minimized by optimizing the write process to compensate for the specific local variations in storage media properties.

SUMMARY

In a first aspect, a method of storing data in a storage medium includes determining a compensation unit for a portion of the storage medium, reading a first set of bit values from the portion of the storage medium, determining a compensation value based at least in part on an erroneous bit value of the first set of bit values and the compensation value, and storing the compensation value in association with the portion of the storage medium.

In a second aspect, a method of storing data in a storage medium includes determining whether a compensation table exists for a portion of the storage medium, when the compensation table exists, writing data from a write buffer to the portion of the storage medium using a write control signal modified with compensation values of the compensation table, and when the compensation table does not exist, writing the data from the write buffer to the portion of the storage medium using an unmodified write control signal.

In a third aspect, a processor accessible non-transitory medium comprises a plurality of instructions to manipulate a processor. The plurality of instructions includes instructions for determining a compensation unit for a portion of the storage medium, instructions for reading a first set of bit values from the portion of the storage medium, instructions for determining a compensation value based at least in part on an erroneous bit value of the first set of bit values and the compensation unit, and instructions for storing the compensation value in association with the portion of the storage medium.

BRIEF DESCRIPTION OF THE DRAWINGS

The present disclosure may be better understood, and its numerous features and advantages made apparent to those skilled in the art by referencing the accompanying drawings.

FIG. 3 includes an illustration of an exemplary compensation schema.

The use of the same reference symbols in different drawings indicates similar or identical items.

DETAILED DESCRIPTION

In an exemplary embodiment, a method for storing data on a storage medium includes using write timing compensation chosen based on analysis of the errors that occur when writing bit values in a relevant portion of the storage medium. In particular, delta values relating to incremental changes in write timing can be tested through writing and verifying to determine a compensation unit for a given portion of the storage medium. The compensation unit can represent an incremental shift in write signal timing, such as a shift of signal edges forward or backward relative to time. Write and verify operations can be further performed to determine write timing compensation values to be associated with positions or addresses within the portion of the storage media through a compensation scheme that increments or decrements compensation values by the compensation unit when erroneous bits are detected through the write and verify operation. For portions of the storage media, such as sectors, a compensation table can be used to store the compensation values in association with positions or addresses within the portion of the storage media. During subsequent write operations, a write control signal and in particular, the timing of edges of a write timing signal, can be modified using the compensation values stored in the compensation table associated with the portion of the storage medium to which data is to be written. Such a process provides improved write fidelity, which can reduce the ECC overhead and increases the areal density of the drive. Further, the methods can be implemented in instructions stored in a non-transitory memory and operable by a microprocessor or microcontroller of a storage device.

Figure 1:
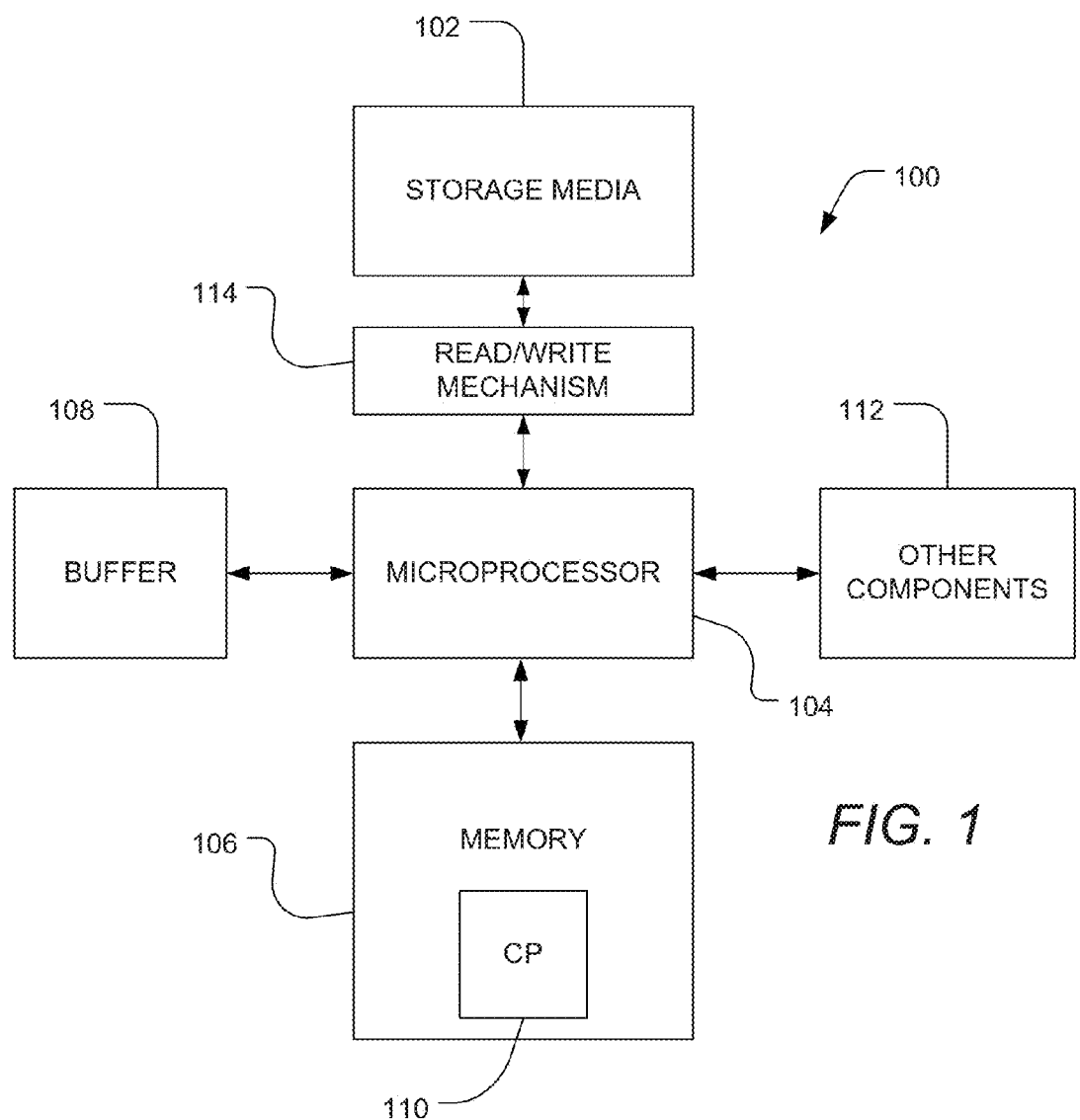
FIG. 1 includes a block diagram illustrating a storage medium.

FIG. 1 shows a hard disk drive (HDD) 100 including a recording disk or HD 102, a microprocessor 104, a read/write mechanism 114, a memory 106, and a buffer 108. The microprocessor 104 is in communication with the HD 102 via the read/write mechanism 114, with the memory 106, with the buffer 108, and with other components of the hard disk drive 100. In an embodiment, the HD 102 can be a patterned magnetic HD, such that each bit of data stored on the HD can be located on a separate island preferably not magnetically connected to the neighboring bit island. Such patterned media is also referred to as bit pattern media (BPM). The HD 102 can be preferably divided into sectors of data cylindrically arranged around the HD. In another embodiment, the HD 102 can be a discrete-track media storage device, such that the data bits are preferably separate discrete locations on the HD, but within the layer of the media which constitutes the recording layer, the separate locations can be more strongly magnetically coupled together along a predominately circumferential direction and be more magnetically decoupled along the predominantly radial direction of the disk storage medium. In another embodiment, the HD 102 can include a magnetic disk that is divided into different continuous magnetic regions, such that each of the different magnetic regions represents a different bit. In the case of the continuous magnetic regions, one data bit may contain many individual grains that are separated by a thin non-magnetic region, where such non-magnetic region has a width typically less than the magnetic grain diameter. In the case of discrete track media, the data tracks can be separated by a non-magnetic region which is of or larger in size than the average magnetic grain size. In another embodiment, the HD 102 can be an optical disk.

In an embodiment, the memory 106 can be a processor accessible medium, such as a non-transitory memory and the memory can include a computer program 110 including instructions for the microprocessor 104, such as instructions for processing the data stored on the HD 102. During a data writing process, the microprocessor 104 preferably utilizes the instructions of the computer program 110 to write the data to the HD 102 utilizing the read/write mechanism 114. In an embodiment, the HD 102 can include a plurality of sectors of data, and each sector can be 4096B of data, where B refers to byte. Another embodiment has the sector containing 512B of data. Additionally, each sector can have parity bits/symbols added to it, such that the parity bits/symbols protect the data against errors through an ECC. Additionally, each sector can contain other information which are used for other purposes, such as for write synchronization, read synchronization, servo position control and additional error correction.

An exemplary ECC used in magnetic recording is a Reed-Solomon (RS) code. A RS code is based on symbols of a certain size, such as 8-bit symbols (bytes) or 10-bit symbols. The parity-symbols in a RS code are obtained as the remainder of dividing the information symbols by a generating polynomial g(x). In an embodiment, a RS code ECC having 10-bit symbols can require 16 parity symbols to correct 8 symbols per sector. A generator polynomial for the RS code would be g0(x)=(x−a)(x−a2) . . . (x−a16), where 'a' is a primitive element of GF(210) (see McWilliams and Sloane, The Theory of Error-Correcting Codes). However, for the RS code to correct 16 symbols per sector, the data may be further encoded together with additional parity-symbols using the polynomial g1(x)=(x−a17)(x−a18) . . . (x−a32). The RS code may need an additional 16 parity-symbols that can be stored in a region of the HD 102. In an embodiment, based on a nested property of RS codes, the product g0(x) g1(x) gives a RS generator polynomial for a code that can be capable of correcting up to 16 symbol errors per sector. The decoding of the RS codes to recover the user-bits can be made either by hard decoding methods, such as the Berlekamp-Massey decoding algorithm, or by soft decoding methods, such as the Koetter-Vardy (based on the Guruswami-Sudan) decoding algorithm.

In another embodiment, the ECC may be implemented using other codes that are not RS codes, such as Low Density Parity-Check (LDPC) codes together with soft decoding. In another embodiment, the ECC may alternate RS codes with LDPC codes. In this embodiment, the RS code may be an "inner" code and the LDPC code an "outer" code, or conversely. For example, the data can be first encoded into an outer code, such as a RS code. Then, the data together with the RS parity symbols can be further encoded using another code, such as an LDPC code. The second code used to encode the data can be called inner code. At the decoding, these operations are reversed, such that the data can be soft decoded using the LDPC iterative decoder. Then, the data can be decoded by applying the decoding algorithm for the RS code.

Initially, the microprocessor 104 can utilize an extra strength ECC, which may be able to correct 16 symbol errors per sector. Depending on the amount of data written to the HD 102, multiple sectors on the HD may be used. The microprocessor 104 can use the extra strength ECC during the initial write of the data so that specific bit-error ratio (BER) requirements can be met. The microprocessor 104 can correct written-in errors of the data when the microprocessor reads the data from the HD 102, and encodes the data based on the parity-symbols of the extra strength ECC. However, the extra strength ECC can utilize a large number of parity-symbols so that the extra strength ECC can correct the desired number of errors, as discussed above. Thus, the amount of data that can be stored on the HD 102 can be reduced from the physical bit areal density, due to addition of parity-symbols which maintain an acceptable sector failure rate.

When written-in errors are low, a lower strength ECC can be used. Knowledge of the write characteristics of a physical sector can be used to modify the write process and reduce the written-in errors, thus reducing the ECC overhead and increasing the amount of customer data that can be stored. Acquiring the additional information takes additional time, but can occur during periods when no real-time input/output (I/O) operations are being performed. Here, the microprocessor 104 can process the data stored on the HD 102 in an iterative fashion to reduce the ECC overhead, compact the channel data, and increase the areal efficiency of the HD.

The error rate for written-in errors can be reduced using a write control signal modified on a bit-by-bit basis to accommodate local variations in media and magnetic properties of the HD 102, as well as to incorporate correction for local pattern-dependent magnetic field variations of the HD. A write timing shift can either delay or advance a write current or a write control signal provided to a bit in an attempt to correct bit error. The microprocessor 104 can increment and decrement the adjustment to the write control signal to reduce written-in errors, while limiting the introduction of errors in neighboring bits. In an embodiment, the maximum offset can be plus or minus 2 ns. In another embodiment, the maximum offset can be plus or minus 1 ns. The compensation chosen for each bit may be different. It may be positive for one bit and negative for a neighboring bit. Each time the microprocessor 104 applies a new adjustment, referred to herein as compensation values, the compensation values can be stored in a compensation table for use during subsequent write operations.

When the written data is reliable, a weaker ECC can be used for the data and the locations of the parity-symbols for the extra strength ECC can be released. Thus, based on the extra parity-symbols of the extra strength ECC being released or deleted, the user-bit capacity of the HD can be increased.

Figure 2:
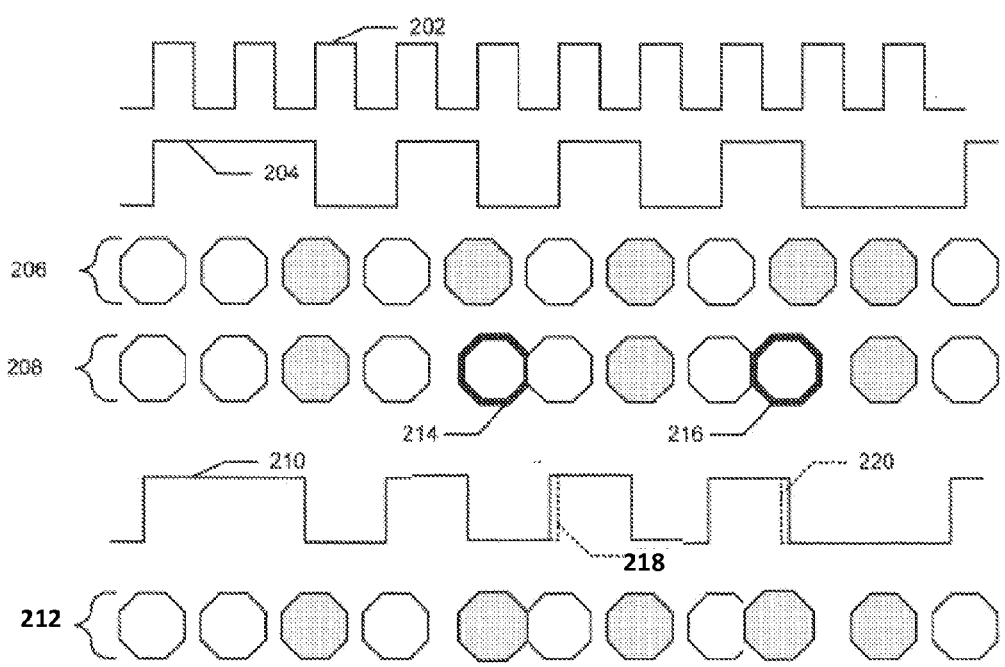
FIG. 2 includes a schematic of a plurality of waveforms and channel bits associated with a storage medium.

FIG. 2 is a schematic of a clock signal 202, a wave-form of a write current or control signal 204, and bit-patterned media writes of channel bits/islands 206, 208, and 212, and a write current 210 modified with compensation values. The bit-patterned media write 206 illustrates a desired written-in set of bit values. While FIG. 2 illustrates a bit-patterned media, other types of media can benefit from the processes described herein, such as a continuous perpendicular storage medium, a thermal assist or HAMR storage medium a discrete-track medium, a tape medium, or an optical storage medium. As indicated in FIG. 2, a write operation can cause a number of islands within the first channel bits 208 to be written incorrectly, such as islands 214 and 216. In both first channel bits 208 and in channel bits 212, both of which correspond to the actual channel bits, island 214 is shown displaced to the right from its correct position, coming into contact with, or close proximity to, the neighboring island to its right, while island 216 is shown displaced to the left from its correct position, coming into contact with, or close proximity to, the neighboring island to its left. Since, the initial writing of the data may have a relatively large probability of written-in errors, an extra strength ECC may be utilized to enable the correct decoding of the user-bits. However, in some examples, the written-in errors for a given portion of a storage medium may overwhelm an ECC.

The write current 204 is synchronized with the clock signal 202, such that the desired bit islands can be set during the initial write, such as the channel bits 208. The initial write of the first channel bits 208 can be read and compared to the desired writing of the user-bits 206. In an embodiment, the user-bits 206 can be determined from the original data written during the initial write decoded using an extra strength ECC associated with the original data. In a particular example, the written-in errors in the first channel bits 208 can be the result of position variations of the bit islands 214 and 216. Alternatively, the written-in errors can be associated with difference in field strength, providing an effective positional variation in the bit islands.

During the processing of the data as described above, a separate compensation value, such as bit-by-bit adjustments to the timing of the write control signal, can be applied to each of the bit islands 214 and 216 in an attempt to correct the written-in error. The compensation values can be incremented and decremented by a compensation unit in accordance with a compensation schema, as described in FIG. 3 and the descriptive text for FIG. 3 below. When the compensation value is incremented or decremented, a new write pass for the bit islands can be performed. The written bit values can be read and compared to the desired writing of the user-bits 206 to determine whether the bit error has been corrected.

A specific compensation value can be selected for each of the bit islands 214 and 216. The data storage error for bit island 214 corresponds to case #7 in FIG. 3: the correct bit pattern of 101 is shown for user-bits 206, while an incorrect bit pattern of 111 was actually written in media write 208, i.e., bit N, the middle bit of the three-bit pattern, was stored as a "1" instead of the correct value of "0". As illustrated in FIG. 3, the correction for case #7 is to modify the write timing for bit N+1, as illustrated by transition 218. This timing correction corresponds to an assumption that the writing of bit N+1 just after the writing of bit N has erroneously written over bit N, thereby causing bit N to have the same value as bit N+1. The data storage error for bit island 216 corresponds to case #5 in FIG. 3: the correct bit pattern of 100 is shown for user-bits 206, while an incorrect bit pattern of 110 was actually written in media write 208, i.e., bit N, the middle bit of the three-bit pattern, was stored as a "1" instead of the correct value of "0". As illustrated in FIG. 3, the correction for case #5 is to modify the timing for writing bit N, as illustrated by transition 220. This timing correction corresponds to an assumption that because island 216 is displaced to the left, the timing for writing bits into island 216 needs to be slightly advanced in time by offset 220 in order to properly write into island 216. Thus, based on the write current variations 218 and 220, the bit islands 214 and 216 can be written correctly as illustrated for media write 212, in spite of the fact that the positioning errors for islands 214 and 216 are unchanged from media write 208. The amount of compensation selected to either delay or advance the write current 210 can be selected based on the compensation values that correct the erroneous bit as shown for various bit error patterns corresponding to cases 3 through 8 in FIG. 3.

In an embodiment, the write control signal 204 can control the timing of a magnetic field generated by a magnetic write head of the HDD 100. Thus, the write control signal 204 can cause the magnetic field to set a bit or symbol of the HD 102 located below the magnetic write head at specific times of the write control signal. In another embodiment, the recording disk 102 can be an optical disk, and the control signal 204 can control the timing of a light from a light source used for heating the recording disk to set a bit of the recording disk under the light source. The light source can be a laser, a light emitting diode (LED), and the like. In another embodiment, the recording disk 102 can be a high anisotropy TAR recording disk, and the control signal 204 can control the timing of the light or intensity of the light from a light source used for heating the recording disk under the light source. The light source can be coupled to a near field transducer near the surface of the disk.

In BPM, in addition to positional variations, written-in errors typically occur due to two main processes: (1) overwriting of a previously written island and (2) insufficient fields to write the desired island. The two error mechanisms can be related to the type of islands—those that are from the low field and those islands from high field parts of the switching field distribution, respectively. In the absence of gross defects, such as missing or merged islands, these two error mechanisms are among the main cause of the written-in errors. The error mechanism can be viewed as stemming from an error in the effective position of a patterned island. Islands with an effective position off by more than a half bit can assume the value of the respective neighboring bit during writing. As a result erroneously written bits can have values that are equal to previous or next written values in the write sequence. Moreover, an overwritten bit can have a value equal to the write state of the next bit and an island which did not experience sufficient fields can have a value equal to the write state of the previous bit.

Hence, the nature of erroneously written bits in correlation to the write values can be used to determine whether they are low field or high field switchers, which in turn can be used to determine a desired compensation timing. The written head field falls roughly linearly with distance and changing the timing of when the field changes can modify the fields experienced by the islands. To prevent over-writing weak (low magnetic field induced magnetic switching) islands, the write timing on the immediate success of bits can be retarded in order to reduce the field experienced by the weak island when writing to a neighbor. To increase the write field when writing strong islands, the write timing can be advanced. In a simple example, the unit of timing change can be constant and denoted as delta ($\delta$). Another recording parameter that can increase or decrease the write strength is the write head current. Higher or lower head currents can increase and decrease the write field and can compensate strong or weak islands, respectively. In thermal assisted recording (TAR), the power applied by the thermal transducer can be varied to compensate for variations in the Curie temperature or anisotropy in an analogous way.

FIG. 3 illustrates an exemplary compensation schema for updating compensation values based on the observed written-in errors. The compensation schema increments or decrements a compensation value by a compensation unit (e.g., delta ($\delta$)) or leaves the compensation value unchanged based at least in part on the nature of the erroneous bit value and the value of neighboring bits.

Data is written into a portion of a storage medium, such as a sector of a storage medium, from a write buffer. The portion of storage medium is read and the read bits are compared to the write buffer to determine errors within the read bits. Based on the nature and position of the error, a compensation value can be determined. In an example, compensation values associated with the timing of edge changes in proximity to an address associated with the erroneous bit value can be incremented or decremented in accordance with a compensation schema.

In the compensation schema illustrated in FIG. 3, the schema can include eight variations in compensation value adjustments, denoted by delta ($\delta$), for each written bit. The compensation values for each written bit are determined in two write and read passes and the final values are used for the third write pass. In the primary embodiment, the compensation values represent the advancement or delay of the write timing. The prefix {+ or −} indicates whether the timing is delayed or advanced, respectively. Indices {1 or 2} indicate which write pass. The superscript {+ or −} notes the possibility that a different pre-compensation magnitude is used for delaying or advancing, respectively. In an example, $\delta_1^+ = \delta_1^- = \delta_2^+ = \delta_2^-$. In another example, $\delta_1^+ = \delta_1^- \delta_2^+ = 2*\delta_1^+ \delta_2^- = 2*\delta_1^-$ In an embodiment, a typical value of $\delta$ is the time it takes a write head to traverse 10% of a bit pitch.

In the first write pass for a given sector, no compensation is used. The data is read back and the bit error locations are determined. The compensation values for the second write pass are determined according to the rules illustrated in FIG. 3. For example, in case 3 if the bit at location N has value 1 and the write values before and after bit N was written were 0 and 1, respectively, then the write time timing for writing bit N+1 is delayed by $\delta_1^+$—this change in write timing corresponds to an assumption that when bit N+1 was written, bit N was over-written, causing bit N to take the same value as bit N+1. For certain errors compensation values cannot be unambiguously determined, such as cases 7 and 8. Here, bit N could have been erroneously written due to any of the two error mechanisms, overwriting or insufficient fields. The compensation value can be picked randomly ($+\delta_1^+$ or $-\delta_1^-$), though in the exemplary embodiment $+\delta_1^+$ is picked. In the second write pass the compensation values are used and data is written to the exact same bit locations on the storage media. The ambiguity in cases 7 and 8 can be resolved by examining the bit errors that resulted in the second write pass. To further reduce the write errors, an optional second read pass and third write pass can be used. After the bit errors are evaluated in the second write pass, the new compensation values for the third write pass are determined according to the rules shown in FIG. 3. Cases 1 and 2 cannot be corrected since no timing changes in the writing of bits N or N+1 can compensate for the writing errors in these cases.

Variations in the material of the recording media, the positioning on the storage media of the portion, for example, relative to the radial center of the storage media, mechanical variations in movement of the device, and statistical variations within the media can lead to different portions of storage medium having a different desirable delta ($\delta$) value or compensation unit. Once the desired compensation unit is identified for a particular portion of the storage medium, compensation values, such as compensation values associated with a timing signal can be determined. Such compensation values can be multiples of the compensation unit. Once the compensation values are determined, they can be stored and utilized for later write operations. In particular, subsequent data can be written to the portion of the storage medium utilizing a write control signal modified with the compensation values stored within a compensation table. The system can utilize a certain degree of reproducibility in the write location from write to write (i.e., write synchronization). Ideally, the reproducibility should be within a small fraction (<10%) of bit cell in both the cross track and down track direction.

Figure 4:
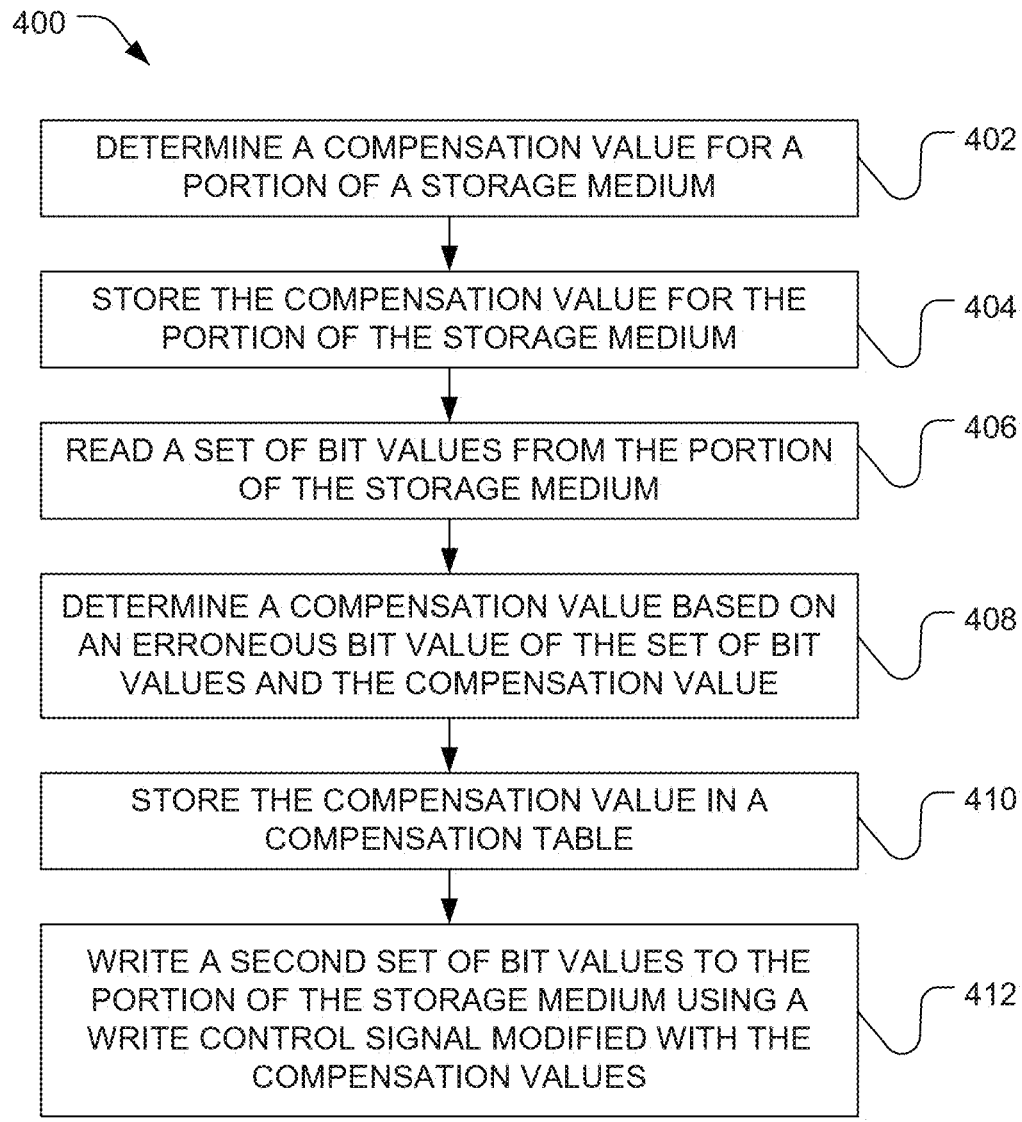
FIG. 4, FIG. 5, FIG. 6, and FIG. 7 include a block flow illustration of exemplary methods for storing data in a storage medium.

FIG. 4 includes an illustration of exemplary method 400 that includes determining a delta ($\delta$) value for a portion of the storage media, as illustrated at 402. As described above, variations in the storage media and related mechanics associated with storage device can yield different desirable delta ($\delta$) values for portions of a storage medium. For a given portion of the storage medium, the preferred delta ($\delta$) values can be determined based on writing random data to the portion, reading the portion and determining error rates. Those delta ($\delta$) values that provide lower error rates can be candidates for the compensation unit to be used in determining compensation values for modifying a write control signal. The procedure can be repeated multiple times on the same region to refine the precision with which delta ($\delta$) is determined. Once the compensation unit is determined, the compensation unit can be stored for the portion of the storage medium, as illustrated at 404.

As illustrated at 406, the portion of the storage medium can be read to acquire a set of bit values. The set of bit values can be compared to bit values written to the portion of storage media and may or may not include errors. Based at least in part on erroneous bit values within the set of bit values and based at least in part on the compensation unit, compensation values can be determined, as illustrated at 408. For example, compensation values can be determined by incrementing or decrementing, for example moving a signal edge forward in time or back in time, based at least in part on a compensation schema mapping the nature of the erroneous bit value and neighboring bit values to a change in compensation value.

Once the compensation values are determined, the compensation values can be stored in the compensation table, as illustrated at 410. In an example, the compensation table can be stored on the storage medium or can be stored on medium separate or different from the storage medium. In a particular example, the compensation table is stored in memory separate from the storage medium and accessible to the processor.

A reduction in error rate is experienced when subsequent data is written to the portion of storage medium. For example, as illustrated at 412, a second set of bit values can be written to the portion of the storage medium using a write control signal modified with the compensation values stored within a compensation table and associated with the portion of the storage medium.

Figure 5:
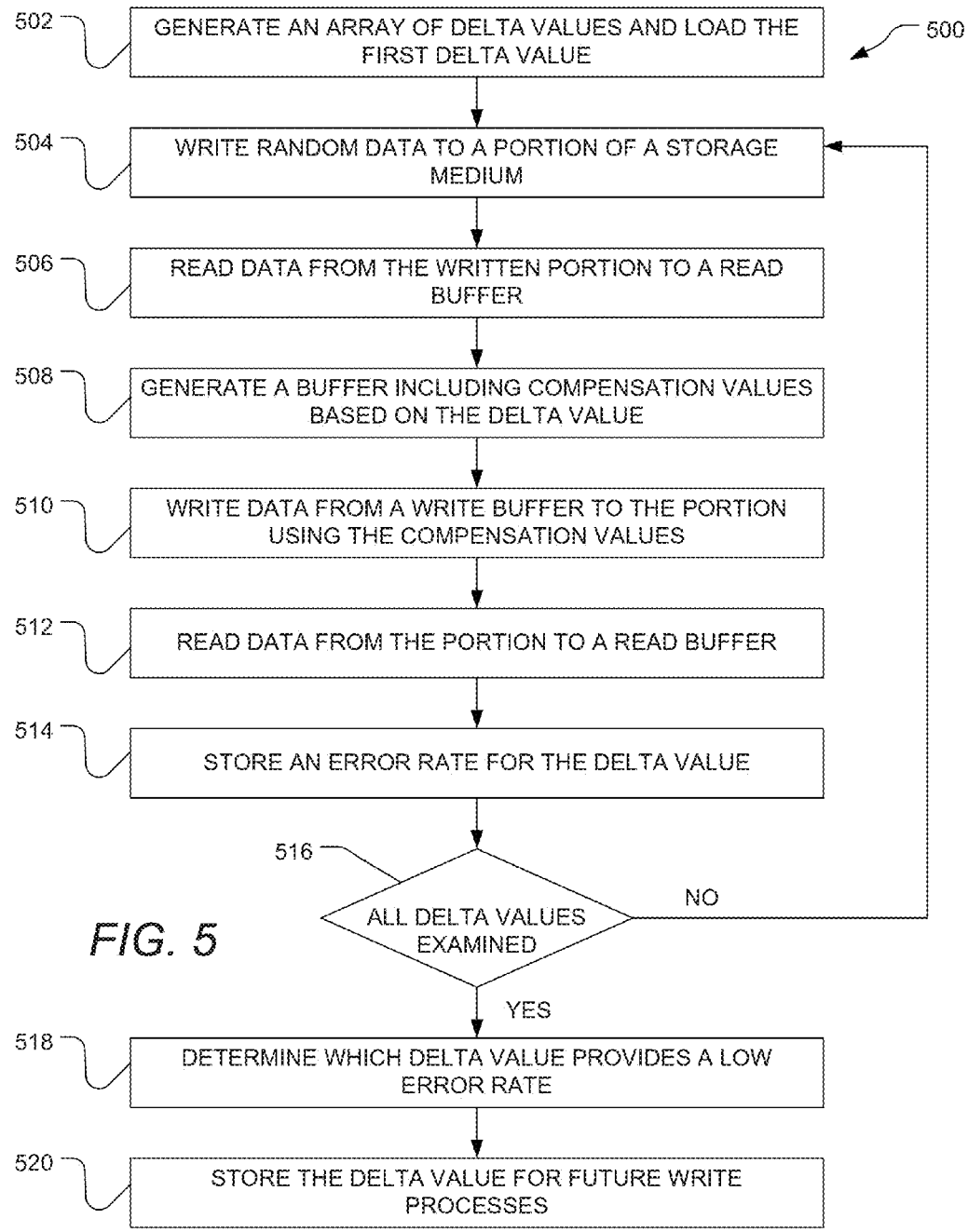

As illustrated in FIG. 4 at 402, the desired compensation unit is determined for a given portion of the storage medium. FIG. 5 illustrates an exemplary method 500 for determining a compensation value for a given portion of the storage medium. For example, the portion of a storage medium can be a sector. However, the portion can be a segment, track or other division of the storage medium. As illustrated at 502, an array of delta ($\delta$) values is generated and the first delta ($\delta$) value is loaded. In particular, the delta ($\delta$) value and the compensation unit represent an incremental change in the timing of a write control signal. For example, the incremental change can move an edge of the write control signal forward in time or backwards in time by the stated increment of the delta ($\delta$) value or compensation unit. Exemplary delta ($\delta$) values can be expressed as a percentage of the time for a write head to traverse a bit pitch. For example, the delta ($\delta$) value can be in a range of 1% to 50%, such as a range of 1% to 25%, a range of 1% to 15%, a range of 2% to 15%, or a range of 5% to 13%, and in particular, can be approximately 10% of the time for a write head to traverse a bit pitch. By bit pitch, is meant the average bit to bit spacing along the data track, e.g., along the circumferential direction for the case of a storage medium which is a rotating disk.

Given the selected delta (δ) value, random data can be written to the portion of the storage medium, as illustrated at 504. In particular, the random data can be stored in a write buffer. Data can be read from the portion of the storage media to a read buffer, as illustrated at 506. The read data can include errors relative to the written random data. Erroneous bit values and associated bit positions can be determined by comparing the read data to a write buffer. Alternatively, the read bit values can be compared to bit values corrected using an ECC associated with the data stored in the portion of the storage medium. Such errors can be utilized in accordance with a compensation schema to generate compensation values based on the selected delta (δ) value. In particular, a buffer to store the compensation values determined based on the delta (δ) value can be generated, as illustrated at 508.

Using the compensation values, data can be written from the write buffer to the portion using a write control signal modified with the compensation values, as illustrated at 510. Again, data can be read from the portion of the storage media to read buffer, as illustrated at 512, and an error rate can be determined for the selected delta (δ) value.

When additional delta (δ) values are to be examined, as illustrated at 516, a different delta (δ) value can be selected and random data can be written to the portion of the storage medium, as illustrated at 504. Data can be read, compensation values can be generated, and an error rate can be determined for the selected delta (δ) value, as illustrated at 514.

Once the delta (δ) values are examined, error rates associated with the delta (δ) values can be evaluated. A delta (δ) value which provides a low error rate can be selected, as illustrated at 518. The delta (δ) value can be stored as a compensation unit for future write processes, as illustrated at 520. Such a compensation unit can be utilized in a method to determine compensation values to be stored in a compensation table for use in subsequent write operations. In particular, the compensation values can be utilized to modify a write control signal, and in particular, the timing of edges within the write control signal to reduce error rates associated with write operations.

In another embodiment, the compensation values are associated the write current or power applied to a thermal transducer. The implementation for these two embodiments is analogous to the implementation for write time shifts. Here, instead of increasing or decreasing timing shifts the compensation is associated with increasing or decreasing write current or write transducer power.

Figure 6:
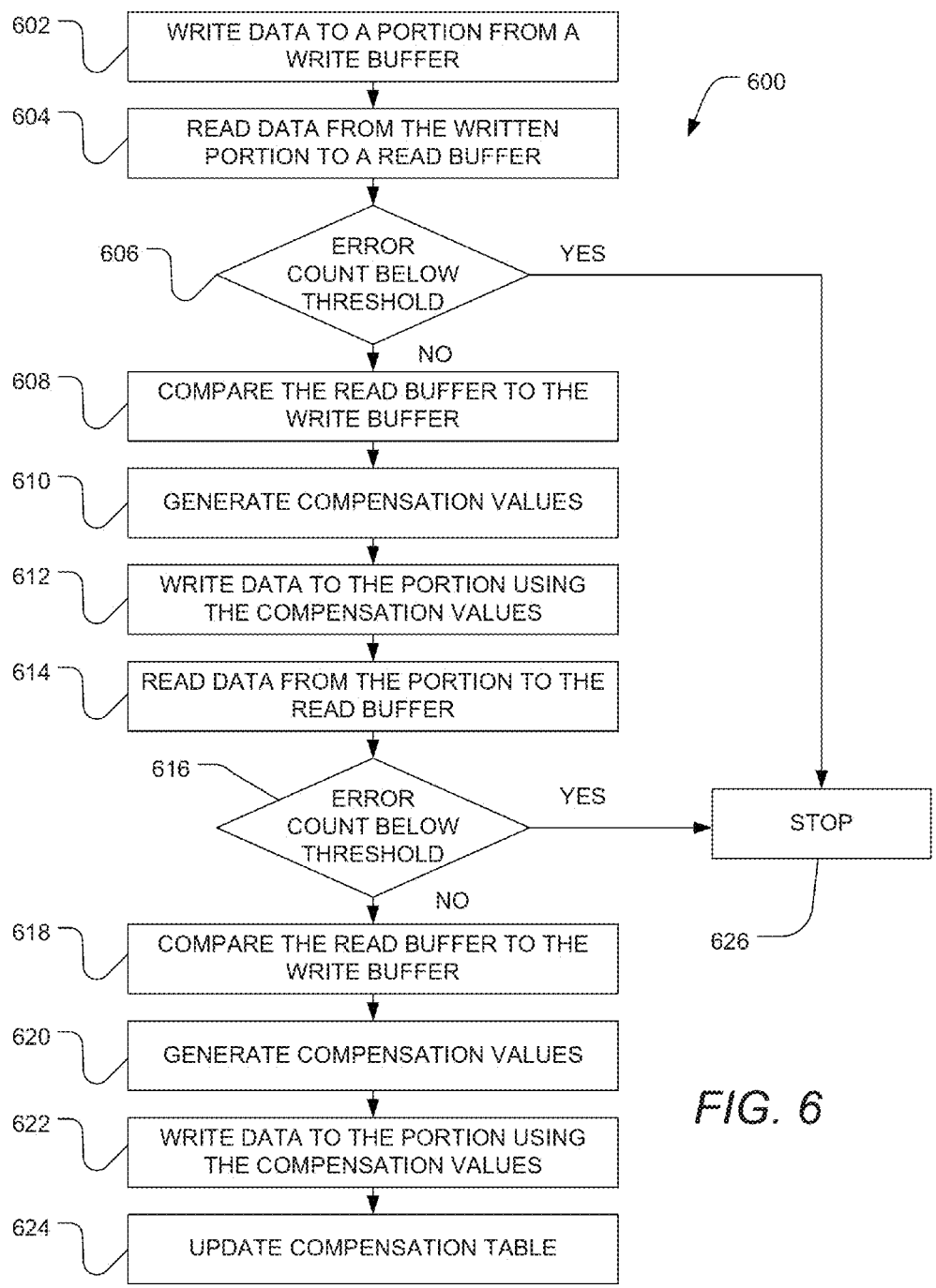

For example, in the method 600 illustrated in FIG. 6, data can be written to a portion of a storage medium, such as a sector, from a write buffer, as illustrated at 602. In an example, the data is customer data and ECC overhead. In another example, the data can be random.

As illustrated at 604, data can be read and decoded using the read channel. The most likely written-in bit states are stored in a read buffer. When the number of errors is relatively low, such as when the error count is below a threshold, as illustrated at 606, the method can be terminated, as illustrated at 626. As a result, a compensation table and compensation values are not generated for a given portion of the storage medium. Subsequent write operations are performed using write control signals that are not modified with compensation values.

When the error count is not below a threshold, as illustrated at 606, the read buffer is compared to the write buffers illustrated 608. Alternatively, comparing the read buffer to the write buffer can be performed before determining whether the error count is below a threshold or can be performed in conjunction with determining whether the error count is below the threshold. For example, the read buffer can be compared to the write buffer to determine the nature and address of erroneous bit values. Alternatively, the bit values stored in the read buffer can be compared to bit values corrected with the associated ECC to determine erroneous bit values and associated bit positions, if the ECC successfully decoded the sector. Using such a determination, compensation values can be generated, as illustrated at 610. For example, the compensation values can be incremented or decremented in accordance with a compensation schema, such as the compensation schema illustrated in FIG. 3.

As illustrated at 612, the data can be written to the portion of the storage medium from the write buffer using a write control signal modified with the generated compensation values. In particular, the compensation values represent changes in signal timing, such as offsets of signal edges forward or backwards in time.

Data can be read from the portion of the storage medium to the read buffer, as illustrated at 614. Optionally, the error count can be compared with thresholds, illustrated 616. For example, when the error count is below a threshold, the process can be stopped, as illustrated at 626. The determine compensation values may or may not be stored in a compensation table.

When the error count is not below a threshold, as illustrated at 616, or alternative to determining whether an error count is below a threshold, the read buffer can be compared to write buffer, as illustrated at 616. Optionally, comparison between the read buffer and the write buffer can occur prior to determining whether an error count is below a threshold. In particular, the read buffer and the write buffer are compared to determine erroneous bit values and associated addresses or positions of such erroneous bit values. Compensation values can be generated based on the erroneous bit values, as illustrated at 620. In particular, the compensation values can be incremented or decremented in accordance with a compensation schema, such as the schema illustrated in FIG. 3, based at least in part on the nature of the erroneous bit value and neighboring values.

As illustrated at 622, data can be optionally written to the portion of the storage medium using the revised compensation values. In particular, the write control signal can be modified using the compensation values to change edge timing, reducing error rates resulting from the write operation. In particular, writing to the portion of the storage medium utilizes write synchronization.

Optionally, the written data can be verified. For example, the written data can be read and optionally corrected. The read data can be compared to the data intended to be written, such as data stored in the write buffer. High error rates can trigger a repeat of the process to determine the compensation values.

Further, the compensation table can be updated, as illustrated at 624. In a particular example, the compensation table can be stored for the portion of the storage media, such as a sector. While the portion of the storage media may represent a sector, other segments, tracks, or divisions of the storage medium can be utilized. In particular, the compensation table stores compensation values associated with addresses within the portion of the storage medium.

While the steps of the methods of FIG. 4, FIG. 5, and FIG. 6 can be performed contemporaneously, each of the methods can pause to permit input/output operations. Such methods can be performed during manufacturing, following first use, or throughout the life of the storage medium. In particular, such methods can be performed during periods of low use, such as periods during which there are little or no input/output operations.

Figure 7:
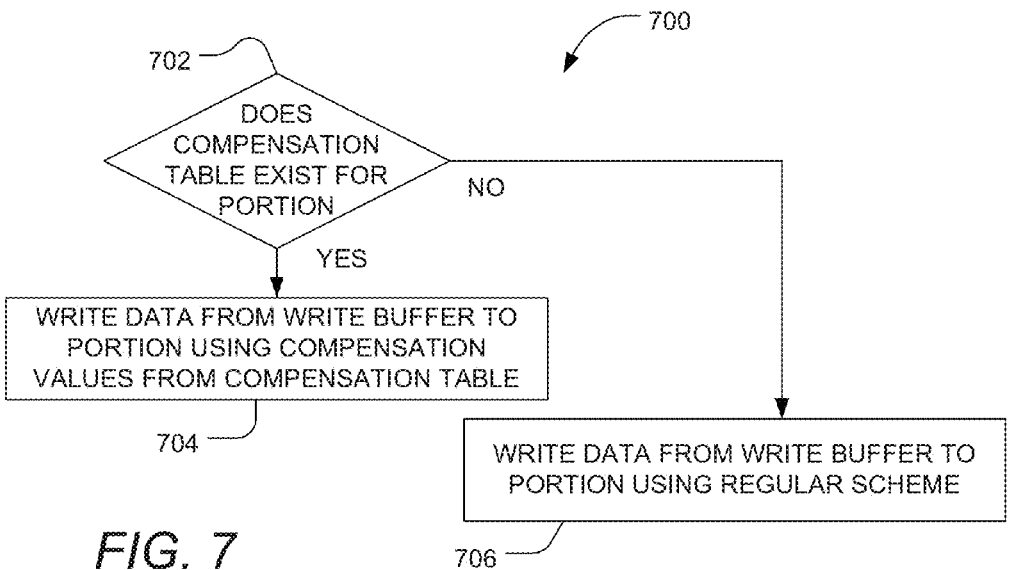

Once portions of a storage media are studied to determine compensation values, such compensation values stored in the compensation table can be utilized to improve writing operations by pre-compensating for statistical variations within the storage medium. As illustrated in FIG. 7, a method 700 includes determining whether a compensation table exists for a given portion of the storage medium, as illustrated at 702. Compensation tables can be stored for differing portions of the storage medium, such as sectors, segments of the same size, divisions of different size, or individual tracks.

When the compensation table does not exist for the portion, data can be written from the write buffer to the portion without modification using compensation values, as illustrated at 706. In particular, a write control signal can be used that is not modified to have signal edges offset relative to the expected timing.

Such a compensation table may not exist because the portion of the devices has not been tested. Alternatively, such a compensation table may not exist because the portion of the storage medium may have low variation and thus provide low error rates even when using an unmodified write control signal.

When a compensation table does exist for a portion of the storage medium, data can be written from a write buffer to the portion of the storage medium using a write control signal modified with compensation values from the compensation table, as illustrated at 704. In particular, the compensation values may represent changes in signal timing that lead to a reduced written-in error rate. In an example, writing to the storage medium includes utilizing write synchronization. Further, when the compensation table exists, an ECC having a lower strength can be stored in or associated with the portion of the storage medium. Alternatively, higher strength ECCs can be used whether or not a compensation table is available.

The ECC overhead associated with the portion of the storage medium can be reduced once an associated compensation table is formed or updated. For example, data can be stored in association with a strong error correction code (ECC) prior to employing the write compensation algorithm and reducing the bit error rate. When a portion of the storage medium has a low error, such as through the use of the compensation table, a lower strength ECC can be used that utilizes less space on the storage medium. In a particular example, the lower strength ECC can be stored in a separate portion of the storage medium from higher strength ECCs. Data can be moved from strong ECC regions to low ECC regions, if the compensation values are known or will be determined. When the higher strength ECCs have been replaced with lower strength ECCs, the portion of the storage medium used to store the higher strength ECCs can be freed to store other data. Alternatively, the use of higher strength ECCs can be maintained. If a high ECC region is to be converted to a low ECC region, customer data in the affected region can be moved to nonvolatile memory while the region is being converted.

Optionally, the written data can be verified by reading, optionally correcting and comparing the corrected data to the data intended to be written. Correcting the data can be performed using the ECC. High error rates may trigger a process to update the compensation table.

The above described methods find particular use for storage media including bit-patterned media, a continuous perpendicular storage medium, a thermal assist or HAMR storage medium a discrete-track medium, a tape medium, or an optical storage medium. In particular, the storage media can include a bit-patterned media.

Such a method for providing compensated write control signals can significantly reduce a written-in error rate of a given portion of a storage medium. For example, for a given sector, an error rate can depend on the effective position of patterned islands. Such an effective position relates to an actual position of the pattern island and the write field strength utilized to change the bit value of the island. Typical BPM discs have effective position variations between 0.1 and 0.2 times the bit pitch. Effective bit position jitter represents the variation in ideal write time due to lithographic variations, switching field distributions, and head field gradients. Effective position jitters are normalized by the bit pitch, so jitters of 0.1 and 0.2 mean a jitter which is 10% and 20% of the bit pitch, respectively. For an effective bit position jitter of 0.13, successive write-verify-rewrite operations can result in a significant bit error rate reduction. For example, utilizing the methods described above, for a jitter of 0.13, a bit error rate is reduced by a factor of 5 after a first write-verify-rewrite operation. A second write-verify-rewrite iteration reduces the bit error rate by a factor of 20. In some examples, further passes do not improve the bit error rate as significantly as the first or second passes.

Figure 8:
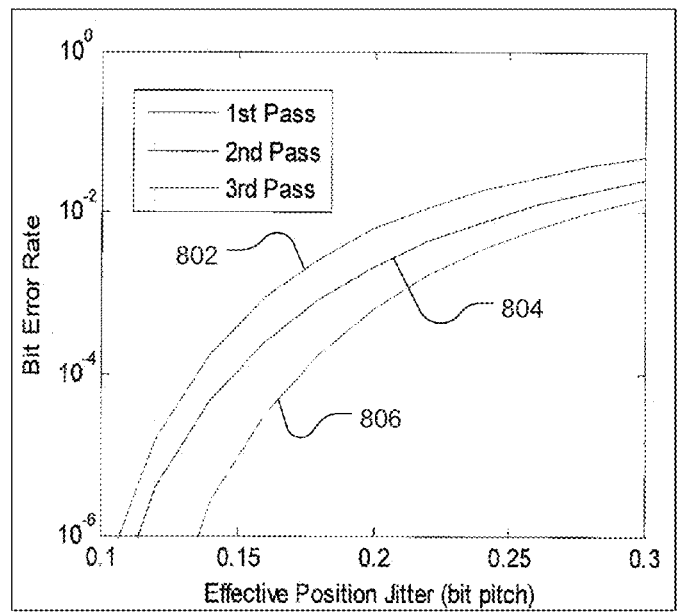
FIG. 8 and FIG. 9 include graphs illustrating exemplary bit error rates and bit error rate reduction relative to effective position jitter.
Figure 9:
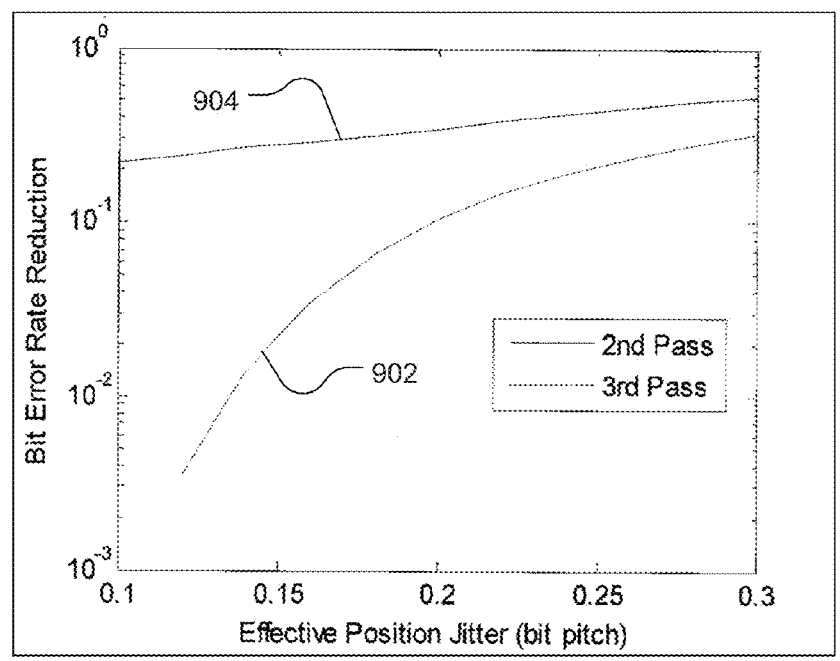

As illustrated in FIG. 8 and FIG. 9, depending on the effective position jitter, multiple passes of a write-verify-rewrite operation using the generated compensation values results in a significant reduction in bit error rate through the third pass, as illustrated in FIG. 8, and results in a significantly improved bit error rate reduction, as illustrated in FIG. 9.

Such a reduction in bit error rate allows for the use of weaker ECCs and lower overhead can improve areal efficiencies. The stored compensation values stored in a compensation table either on the storage media or on a separate memory significantly reduces the write time in future write operations, while maintaining relatively low bit error rates. In an example, the compensation table can be a fixed table derived at the time of the drive build or initial use. In another example, the compensation table can be updated during the course of the drive life, further compensating for degradation of the storage medium over time.

In one embodiment, the present disk drive system contains sectors having different amounts of ECC. In the simplest case there are two types of sectors, one with stronger ECC (high overhead) and one with weaker ECC (lower overhead). The strong ECC sectors have sufficient overhead to not utilized write compensation. The weaker ECC sectors utilize write compensation, but the ECC is strong enough to successfully decode the sector if the sector is written with drive compensation. The compensation can be determined using the algorithm discussed herein. The drive system keeps track of which sectors have which overhead and hence how they are written. During idle times, data can be moved from strong ECC to weaker ECC regions.

In a particular example, the areal efficiency of the storage medium is dynamic in time. Initially, the areal efficiency of the region in which new data is written is lower, since more space on the drive is used to accommodate higher power ECC. As the present method is applied, the quality of the written data is improved to have lower error rate. Such a lower error rate permits use of a less powerful ECC, so less space is utilized by the new ECC. The extra space that is available by as a result of a smaller-sized ECC can be utilized for storing more data. Hence the areal efficiency is increased. This process is repeated each time new data is written. Initially the data is written with a very high power, longer-length ECC, and is then corrected, verified and a lower-powered, but adequately strong ECC is used.

The timing of when to apply the present method is flexible. The method can be utilized when the drive has idle time. The method may or may not be performed immediately subsequent to the first writing of the data. The drive can be occupied by other tasks for short or very long periods of times and can even be turned off and powered down for long periods of time before the present method is applied. At a future time, the present method can be applied to correct the quality of the data. The algorithm can be applied selectively. Not all data sectors that are written may be improved.

In an alternative embodiment, the areal efficiency of the drive is static and not dynamic in time. In this embodiment, the quality of the written data is improved, resulting in a lower error rate and a higher reliability of reading back the intended value of the written data, but the power of the ECC is left un-changed.

In a first aspect, a method of storing data in a storage medium includes determining a compensation unit for a portion of the storage medium, reading a first set of bit values from the portion of the storage medium, determining a compensation value based at least in part on an erroneous bit value of the first set of bit values and the compensation unit, and storing the compensation value in association with the portion of the storage medium.

In an example of the first aspect, the method further includes writing a second set of bit values to the portion of the storage medium using a write control signal modified with the compensation value, wherein writing the second set of bit values includes utilizing write synchronization. In an example, the method further includes reading a third set of bit values from the portion of the storage medium following writing the second set of bit values and verifying the third set of bit values. In a further example, writing the second set of bit values includes utilizing write synchronization.

In another example of the first aspect and the above examples, storing the compensation value includes storing the compensation value on a second storage medium different from the storage medium.

In an example of the first aspect and the above examples, determining the compensation unit can be repeated.

In a further example of the first aspect and the above examples, storing the compensation value includes storing the compensation value and a bit position within the portion of the storage medium.

In an additional example of the first aspect and the above examples, determining the compensation unit includes writing data to the portion of the storage medium using a write control signal modified with a first delta value, reading a second set of bit values from the portion of the storage medium, and determining an error rate associated with the second set of bit values. Further, determining the compensation unit can further include selecting a second delta value, writing to the portion of the storage medium using a write control signal modified with the second delta value, reading a third set of bit values from the portion of the storage medium, determining a second error rate associated with the third set of bit values, and determining a compensation unit based at least in part on error rates associated with delta values.

In another example of the first aspect and the above examples, the storage medium is a bit patterned storage medium, a continuous perpendicular storage medium, a thermal assist or HAMR storage medium a discrete-track medium, a tape medium, or an optical storage medium. In a particular example, the storage medium is a bit patterned storage medium.

In a further example of the first aspect and the above examples, the compensation value is a signal edge compensation value.

In another example of the first aspect and the above examples, the compensation value is associated with a write signal amplitude.

In an additional example of the first aspect and the above examples, determining the compensation value includes adjusting the compensation value by the compensation unit in accordance with a compensation schema based at least in part on the erroneous bit value of the first set of bit values.

In another example of the first aspect and the above examples, the method further includes writing to the portion of the storage medium from a write buffer prior to reading the first set of bit values, comparing the first set of bit values to the write buffer, and determining the erroneous bit value and erroneous bit address based at least on comparing. For example, the method can further include writing to the portion of the storage medium from the write buffer using a write control signal modified with the compensation value, reading a second set of bit values from the portion of the storage medium, comparing the second set of bit values to the write buffer, and determining a second compensation value based at least in part on a second erroneous bit value of the second set of bit values and the compensation unit.

In a further example of the first aspect and the above examples, storing the compensation value includes storing the compensation value in a compensation table that includes compensation values associated with bit positions within the portion of the storage medium, the compensation table associated with the portion of the storage medium. In an example, the method further includes replacing an error correction code (ECC) associated with the portion of the storage medium with a lower strength ECC when the portion of the storage medium is associated with a compensation table. In an example, the lower strength ECC is stored in a separate portion of the storage medium from the ECC.

In an additional example of the first aspect and the above examples, the compensation unit is in a range of 5% to 15% of the time for a write head to traverse a bit pitch.

In a second aspect, a method of storing data in a storage medium includes determining whether a compensation table exists for a portion of the storage medium, when the compensation table exists, writing data from a write buffer to the portion of the storage medium using a write control signal modified with compensation values of the compensation table, and when the compensation table does not exist, writing the data from the write buffer to the portion of the storage medium using an unmodified write control signal. Writing the data includes utilizing write synchronization In an example of the second aspect, the storage medium can be a bit patterned magnetic medium, a continuous perpendicular storage medium, a thermal assist or HAMR storage medium a discrete-track medium, a tape medium, or an optical storage medium. In a particular example, the storage medium is a bit patterned storage medium.

In another example of the second aspect and the above examples, the compensation table includes compensation values associated with addresses within the portion of the storage medium.

In a further example of the second aspect and the above examples, the compensation value is a signal edge compensation value.

In another example of the second aspect and the above examples, the compensation value is associated with a write signal amplitude.

In an additional example of the second aspect and the above examples, the modified write control signal includes signal edges adjusted in time by a compensation value associated with a bit position associated with the signal edge.

In a third aspect, a processor accessible non-transitory medium comprising a plurality of instructions to manipulate a processor. The plurality of instructions includes instructions for determining a compensation unit for a portion of the storage medium, instructions for reading a first set of bit values from the portion of the storage medium, instructions for determining a compensation value based at least in part on an erroneous bit value of the first set of bit values and the compensation unit, and instructions for storing the compensation value in association with the portion of the storage medium.

In an example of the third aspect, the plurality of instructions further includes writing a second set of bit values to the portion of the storage medium using a write control signal modified with the compensation value.

In another example of the third aspect and the above examples, storing the compensation value includes storing the compensation value and a bit position within the portion of the storage medium.

In a further example of the third aspect and the above examples, the compensation value is an edge compensation value.

In an additional example of the third aspect and the above examples, the compensation value is associated with a write signal amplitude.

In another example of the third aspect and the above examples, writing the data includes utilizing write synchronization.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of storing data in a storage medium, the method comprising:
   determining a compensation unit for a portion of the storage medium;
   reading a first set of bit values from the portion of the storage medium;
   determining a compensation value based at least in part on an erroneous bit value of the first set of bit values and the compensation unit;
   storing the compensation value in association with the portion of the storage medium;
   writing a second set of bit values to the portion of the storage medium using a write control signal modified with the compensation value, wherein writing the second set of bit values includes utilizing write synchronization;
   reading a third set of bit values from the portion of the storage medium following writing the second set of bit values; and
   verifying the third set of bit values.

2. The method of claim 1, wherein determining the compensation unit is repeated.

3. The method of claim 1, wherein storing the compensation value includes storing the compensation value on a second storage medium different from the storage medium.

4. The method of claim 1, wherein storing the compensation value includes storing the compensation value and a bit position within the portion of the storage medium.

5. The method of claim 1, wherein the storage medium is a bit patterned storage medium, a continuous perpendicular storage medium, a thermal assist or HAMR storage medium a discrete-track medium, a tape medium, or an optical storage medium.

6. The method of claim 1, wherein the compensation value is a signal timing edge compensation value.

7. The method of claim 1, wherein the compensation value is associated with a write signal amplitude.

8. The method of claim 1, wherein determining the compensation value includes adjusting the compensation value by the compensation unit in accordance with a compensation schema based at least in part on the erroneous bit value of the first set of bit values.

9. The method of claim 1, wherein storing the compensation value includes storing the compensation value in a compensation table that includes compensation values associated with bit positions within the portion of the storage medium, the compensation table associated with the portion of the storage medium.

10. The method of claim 9, further comprising replacing an error correction code (ECC) associated with the portion of the storage medium with a lower strength ECC when the portion of the storage medium is associated with a compensation table.

11. The method of claim 10, wherein the lower strength ECC is stored in a separate portion of the storage medium from the ECC.

12. The method of claim 1, wherein the compensation unit is in a range of 1% to 50% of the time for a write head to traverse a bit pitch.

13. A method of storing data in a storage medium, the method comprising:
   determining a compensation unit for a portion of the storage medium;
   reading a first set of bit values from the portion of the storage medium;
   determining a compensation value based at least in part on an erroneous bit value of the first set of bit values and the compensation unit;
   storing the compensation value in association with the portion of the storage medium;
   writing data to the portion of the storage medium using a write control signal modified with a first delta value;
   reading a second set of bit values from the portion of the storage medium; and
   determining an error rate associated with the second set of bit values.

14. The method of claim 13, wherein determining the compensation unit further comprises:
   selecting a second delta value;
   writing to the portion of the storage medium using a write control signal modified with the second delta value;
   reading a third set of bit values from the portion of the storage medium;
   determining a second error rate associated with the third set of bit values; and
   determining a compensation unit based at least in part on error rates associated with delta values.

15. A method of storing data in a storage medium, the method comprising:
   determining a compensation unit for a portion of the storage medium;
   reading a first set of bit values from the portion of the storage medium;
   determining a compensation value based at least in part on an erroneous bit value of the first set of bit values and the compensation unit;
   storing the compensation value in association with the portion of the storage medium;
   writing to the portion of the storage medium from a write buffer prior to reading the first set of bit values;
   comparing the first set of bit values to the write buffer; and
   determining the erroneous bit value and erroneous bit address based at least on the comparing.

16. The method of claim 15, further comprising:
   writing to the portion of the storage medium from the write buffer using a write control signal modified with the compensation value;
   reading a second set of bit values from the portion of the storage medium;
   comparing the second set of bit values to the write buffer; and
   determining a second compensation value based at least in part on a second erroneous bit value of the second set of bit values and the compensation unit.

17. A processor accessible non-transitory medium comprising a plurality of instructions to manipulate a processor, the plurality of instructions comprising:
   instructions for determining a compensation unit for a portion of the storage medium;
   instructions for reading a first set of bit values from the portion of the storage medium;
   instructions for determining a compensation value based at least in part on an erroneous bit value of the first set of bit values and the compensation unit; and
   instructions for storing the compensation value in association with the portion of the storage medium;
   instructions for writing data to the portion of the storage medium using a write control signal modified with a first delta value;
   instructions for reading a second set of bit values from the portion of the storage medium; and
   instructions for determining an error rate associated with the second set of bit values.

18. The processor accessible non-transitory medium of claim 17, wherein the plurality of instructions further comprise writing a second set of bit values to the portion of the storage medium using a write control signal modified with the compensation value.

19. The processor accessible non-transitory medium of claim 17, wherein storing the compensation value includes storing the compensation value and a bit position within the portion of the storage medium.

20. The processor accessible non-transitory medium of claim 17, wherein the compensation value is an edge compensation value.

21. The processor accessible non-transitory medium of claim 17, wherein the compensation value is associated with a write signal amplitude.

22. The processor accessible non-transitory medium of claim 17, wherein writing the second set of bit values includes utilizing write synchronization.

* * * * *